US012756591B2

(12) United States Patent
Itagawa

(10) Patent No.: US 12,756,591 B2
(45) Date of Patent: Oct. 6, 2026

(54) COMMUNICATION RECEIVER

(71) Applicant: DENSO CORPORATION, Kariya-city (JP)

(72) Inventor: Taichi Itagawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 77 days.

(21) Appl. No.: 18/906,312

(22) Filed: Oct. 4, 2024

(65) Prior Publication Data

US 2025/0219865 A1 Jul. 3, 2025

(30) Foreign Application Priority Data

Dec. 28, 2023 (JP) ................................. 2023-223489

(51) Int. Cl.
*H04L 12/40* (2006.01)
*G06F 13/42* (2006.01)

(52) U.S. Cl.
CPC .... *H04L 12/40032* (2013.01); *G06F 13/4282* (2013.01)

(58) Field of Classification Search
None
See application file for complete search history.

(56) References Cited

U.S. PATENT DOCUMENTS

2008/0295140 A1* 11/2008 Praden ............... H04N 7/17318 348/E7.071
2011/0063506 A1* 3/2011 Reams ............ H04N 21/43615 348/553
2019/0268397 A1* 8/2019 Oh ................... H04N 21/85403
2020/0092126 A1* 3/2020 Ramanathan ......... H04L 12/281
2022/0197773 A1* 6/2022 Butler ................ H04N 21/2223
2024/0070099 A1* 2/2024 van Dijk ................ G06F 13/40

FOREIGN PATENT DOCUMENTS

CN 119025251 A * 11/2024 ............... G06F 8/60
JP 2022-186222 A 12/2022

* cited by examiner

*Primary Examiner* — Chris Parry
*Assistant Examiner* — Abderrahmen Chouat
(74) *Attorney, Agent, or Firm* — Posz Law Group, PLC

(57) ABSTRACT

A communication receiver is connected to a main control unit of a communication device, and includes a first IF, a second IF, a service control unit, and a service IF unit. The service control unit transmits a search message to the electronic control unit conforming to the first protocol, which is a service communication protocol, based on the first setting information received from the main control unit via the first IF. The service IF unit converts an event message conforming to the first protocol or the second protocol received from the electronic control device into stream data based on the second setting information received from the main control unit via the first IF, and transmits the stream data to the main control unit via the second IF.

8 Claims, 9 Drawing Sheets

FIG. 4

SERV SEARCH AND SET VAL RELATED TO SUBJ NODE

| | |
|---|---|
| MAC ADD OF SUBJ NODE | XX:XX:XX:XX:XX:XX |
| IP ADD OF SUBJ NODE | 192.168.10.10 |
| MULTICAST ADD OF SERV SEARCH | 224.0.0.17 |
| PORT NUM OF SERV SEARCH | 1234 |
| PORT NUM OF SERV COM | 5678 |
| MULTICAST ADD OF EVENT DISTRIB | 224.0.0.18 |
| SERV ID | 1 |

FIG. 5

SET VAL USED FOR DAT MUTUAL CONV WITH SERVER

| #1 | SERV TYPE | ID | TP Protocol | DAT STORAGE DEST ADD |
|---|---|---|---|---|
| 1 | EVENT | 2 | UDP | XX |
| 2 | EVENT | 3 | IEEE1722 | XX |
| 3 | : | : | : | : |
| 4 | : | : | : | : |

FIG. 6

INF RELATED TO SERVER DISTRIB SUBSCR EVENT

| #1 | EVENT ID | SERVER IP ADD |
|---|---|---|
| 1 | 2 | 192.169.10.20 |
| 2 | : | : |
| 3 | : | : |
| 4 | | |

| ST | EXPLANATION |
|---|---|
| NotRequested | ST NOT REQ SERV |
| Searching For Service | ST STAR SERV REQ AND SEARCH SERV<br>SERV SERVER TRANS Find SERV |
| Service Rady | ST AVAIL FOR SERV USAGE<br>SERV RECEIV STOPS TRANS Find SERV AND STARTS USING SERV<br>SERV RECEIV CAN TRANS RECEIVED EVENT DAT TO HOST DEV REGARDLESS OF SUBSCR ST OF SERV |

FIG. 9B

| ST | EXPLANATION |
|---|---|
| Released | ST NOT DISTRIB SERV |
| Requested | ST REQUIRE SUBSCR OF SERV EVENT<br>SERV RECEIV TRANS Subscribe Event Group AT PREDET INTERVALS<br>SERV RECEIV CAN TRANS RECEIVED EVENT DAT TO HOST DEV |
| EventgroupAvailable | ST DISTRIB SERV<br>UPON RECEIVING Subscribe Event Group Ack, SERV TRANSCEIVER STOPS TRANS Subscribe Event Group AT PREDET INTERVALS<br>SERV RECEIV TRANS RECEIVED EVENT DAT TO HOST DEV |

COMMUNICATION RECEIVER

CROSS REFERENCE TO RELATED APPLICATION

The present application claims the benefit of priority from Japanese Patent Application No. 2023-223489 filed on Dec. 28, 2023. The entire disclosure of the above application is incorporated herein by reference.

TECHNICAL FIELD

The present disclosure relates to a technique for achieving service-oriented communication.

BACKGROUND ART

The in-vehicle communication system according to a conceivable technique includes an integrated ECU, a plurality of relay ECUs connected to the integrated ECU, and a plurality of ECUs connected to each of the plurality of relay ECUs, and performs service-oriented communication with the integrated ECU as a server and the plurality of relay ECUs and the plurality of ECUs as clients. Specifically, in the above-described in-vehicle communication system, each of the relay ECUS as relay devices converts data conforming to a protocol other than the service-oriented protocol into the service-oriented protocol, thereby the service-oriented communication is realized between each of the relay devices and the integrated ECU.

SUMMARY OF INVENTION

According to an example, a communication receiver is connected to a main control unit of a communication device, and includes a first IF, a second IF, a service control unit, and a service IF unit. The service control unit transmits a search message to the electronic control unit conforming to the first protocol, which is a service communication protocol, based on the first setting information received from the main control unit via the first IF. The service IF unit converts an event message conforming to the first protocol or the second protocol received from the electronic control device into stream data based on the second setting information received from the main control unit via the first IF, and transmits the stream data to the main control unit via the second IF.

BRIEF DESCRIPTION OF THE DRAWINGS

The above and other objects, features and advantages of the present disclosure will become more apparent from the following detailed description made with reference to the accompanying drawings. In the drawings:

FIG. 4 is a diagram showing an example of a search for services held by a host device of a client ECU, and setting values related to the subject node according to the embodiment;

FIG. 5 is a diagram illustrating an example of the set value to be used for data mutual conversion between the host device of the client ECU and a server ECU according to the embodiment;

FIG. 6 is a diagram showing an example of information regarding the server ECU that distributes a subscription event provided by the host device of the client ECU according to the embodiment;

FIGS. 9A and 9B are diagrams showing the transition of an event subscription state of a service receiver of a client ECU according to the embodiment.

DETAILED DESCRIPTION

In the in-vehicle communication system according to the conceivable technique, the processing unit of the integrated ECU includes a protocol stack for the service-oriented communication and generates a message of the service-oriented protocol. However, depending on the application of the ECU, the microcomputer included in the ECU may have low processing capabilities. It is not possible to implement a protocol stack in such a microcomputer.

One aspect of the present embodiments provides a technique for achieving service-oriented communication even in a case where a protocol stack cannot be implemented in a main control unit of a communication device.

A communication receiver according to one aspect of the present embodiments is a communication receiver connected to a main control unit of a communication device configured to be connected to an electronic control device via a single or a plurality of communication lines, and includes a first interface, a second interface, a service control unit, and a service interface unit. The first interface is connected to the main control unit. The second interface is connected to the main control unit. The service control unit transmits a search message for searching for a service to the electronic control device conforming to the first protocol, which is a service communication protocol, based on the first setting information received from the main control unit via the first interface. The service interface unit converts an event message received from the electronic control device conforming to a first protocol or a second protocol different from the first protocol into stream data based on second setting information received from the main control unit via the first interface, and transmits the stream data to the main control unit via the second interface.

A communication receiver according to one aspect of the present embodiments is connected to a main control unit, and first setting information and second setting information are set therein. Thus, it is possible to introduce the service-oriented communication into the communication device even if a protocol stack for service communication cannot be implemented in the main control unit. Thus, the service-oriented communication can be realized overall between the communication device and the electronic control device.

1. Configuration

Figure 1:
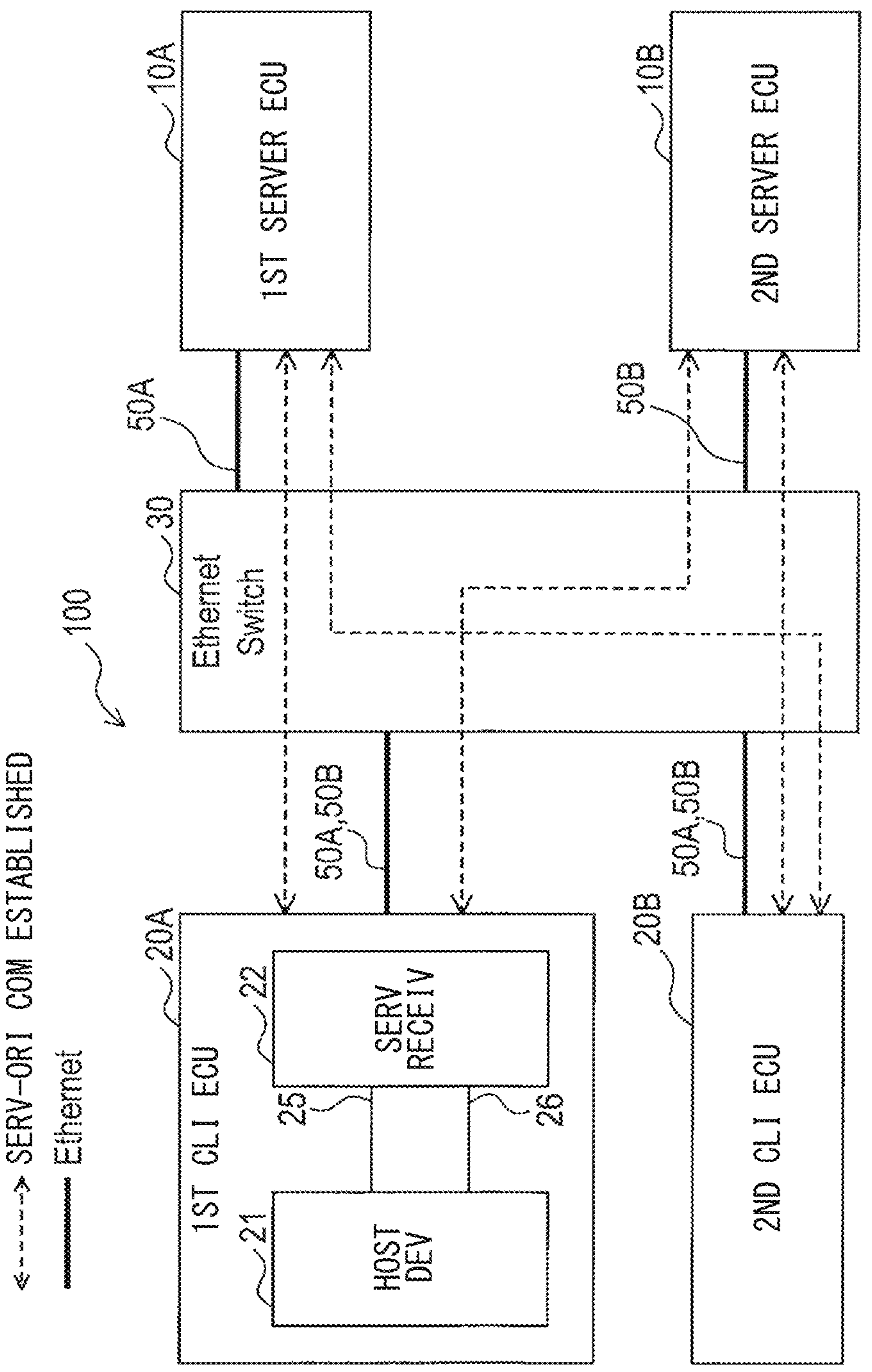
FIG. 1 is a block diagram illustrating the configuration of a communication system according to an embodiment.

The following will describe a configuration of a communication system 100 according to the present embodiment with reference to FIG. 1. In this embodiment, the communication system 100 is mounted on a vehicle. In another embodiment, at least a part of the communication system 100 may be installed in a moving body other than a vehicle, such as a ship, a train, or an airplane, or in a building, or may be in a mobile terminal.

The communication system 100 includes a first server electronic control device (hereinafter, referred to as ECU) 10A, a second server ECU 10B, a first client ECU 20A, a second client ECU 20B, and an Ethernet switch 30. In this embodiment, the first client ECU 20A and the second client ECU 20B correspond to the communication device of the present embodiments, and the first server ECU 10A and the second server ECU 10B correspond to the electronic control device of the present embodiments.

In another embodiment, the communication system 100 may have one or more first server ECUs 10A and not have a second server ECU 10B, or may have one or more second server ECUs 10B and not have a first server ECU 10A. Alternatively, the communication system 100 may include another server ECU in addition to the first server ECU 10A and/or the second server ECU 10B.

In another embodiment, the communication system 100 may have one or more first client ECUs 20A and no second client ECU 20B, or may have one or more second client ECUs 20B and no first client ECU 20A. Alternatively, the communication system 100 may include another client ECU in addition to the first client ECU 20A and/or the second client ECU 20B.

The basic configuration of the first server ECU 10A is the same as the basic configuration of the second server ECU 10B. The first server ECU 10A is connected to the Ethernet switch 30 via a first Ethernet signal line 50A. The second server ECU 10B is connected to the Ethernet switch 30 via a second Ethernet signal line 50B. The first Ethernet signal line 50A and the second Ethernet signal line 50B transmit signals according to the Ethernet protocol. "Ethernet" is a registered trademark. In another embodiment, the first server ECU 10A may be connected to the Ethernet switch 30 via another Ethernet signal line in addition to the first Ethernet signal line 50A. Furthermore, the second server ECU 10B may be connected to the Ethernet switch 30 via another Ethernet signal line in addition to the second Ethernet signal line 50B.

The basic configuration of the first client ECU 20A is the same as the basic configuration of the second client ECU 20B. Each of the first client ECU 20A and the second client ECU 20B is connected to the Ethernet switch 30 via a first Ethernet signal line 50A and/or a second Ethernet signal line 50B. In this embodiment, the bandwidth of the first Ethernet signal line 50A is wider than the bandwidth of the second Ethernet signal line 50B. For example, the bandwidth of the first Ethernet signal line 50A is 10 Gbits per second, and the bandwidth of the second Ethernet signal line 50B is 10 Mbits per second. In another embodiment, each of the first client ECU 20A and the second client ECU 20B may be connected to the Ethernet switch 30 via other Ethernet signal lines in addition to the first Ethernet signal line 50A and/or the second Ethernet signal line 50B.

The Ethernet switch 30 establishes Ethernet communication between the first server ECU 10A and the first client ECU 20A and/or the second client ECU 20B, and between the second server ECU 10B and the first client ECU 20A and/or the second client ECU 20B. In addition, the Ethernet switch 30 may establish Ethernet communication between the first server ECU 10A and the second server ECU 10B, or may establish Ethernet communication between the first client ECU 20A and the second client ECU 20B. The Ethernet switch 30 relays Ethernet packets between ECUs with which Ethernet communication has been established.

Figure 2:
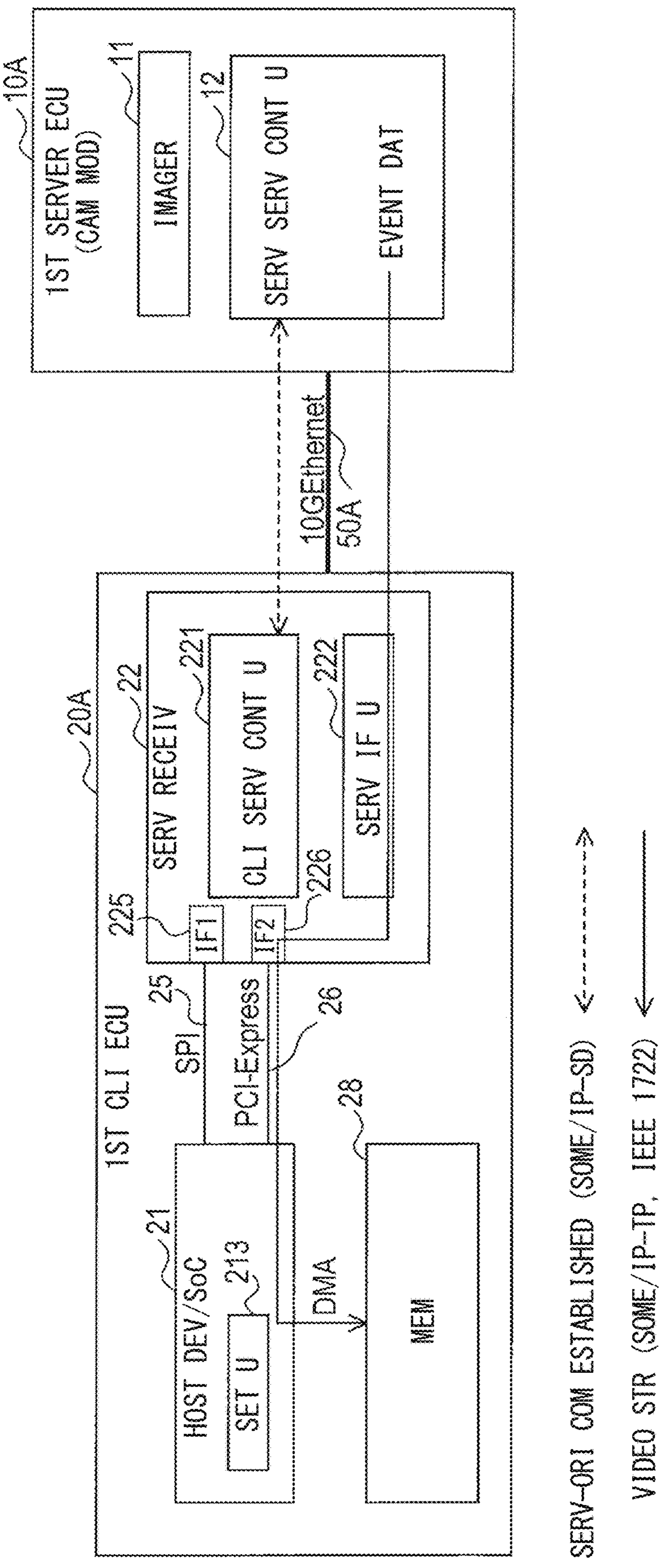
FIG. 2 is a block diagram showing a configuration of a server ECU and a client ECU according to the embodiment.

Next, the configuration of the first server ECU 10A will be described with reference to FIG. 2. The first server ECU 10A is a camera module that captures video and transmits a video stream to the first client ECU 20A and/or the second client ECU 20B. A video stream is stream data that is generated continuously and may include time information.

The first server ECU 10A includes an imager 11 and a server service control unit 12. The imager 11 provides a camera service to the first client ECU 20A and/or the second client ECU 20B.

The server service control unit 12 implements a protocol stack for realizing the service-oriented communication, and distributes the video data captured by the imager 11 as event data. Specifically, the server service control unit 12 implements the service-oriented communication protocol such as Scalable service-Oriented Middleware over Internet Protocol (hereinafter, SOME/IP) and Data Distribution Service (hereinafter, DDS). SOME/IP and DDS are realized on the Transmission Control Protocol/Internet Protocol (hereinafter referred to as TCP/IP). In this embodiment, SOME/IP and DDS correspond to the first protocol of the present embodiments.

Furthermore, the server service control unit 12 may implements a protocol stack for distributing large volumes of data. Specifically, the server service control unit 12 may implement a protocol such as the Institute of Electrical and Electronics Engineers (hereinafter referred to as IEEE) 1722 in order to distribute large amounts of data. In this embodiment, IEEE 1722 corresponds to the second protocol of the present embodiments.

The server service control unit 12 transmits a presentation message for providing a service to the first and second client ECUs 20A and 20B via the first Ethernet signal line 50A. The presentation message conforms to SOME/IP or DDS, includes a service ID, and indicates the content of the service provided by the first server ECU 10A. When the server service control unit 12 receives a subscription request for event data from the first client ECU 20A and/or the second client ECU 20B, the service-oriented communication is established between the first server ECU 10A and the first client ECU 20A and/or the second client ECU 20B.

After establishing the service-oriented communication, the server service control unit 12 transmits the event data to the first client ECU 20A and/or the second client ECU 20B via the first Ethernet signal line 50A at predetermined intervals conforming to SOME/IP or IEEE1722. The event data is a video stream.

The second server ECU 10B includes a micro processing unit different from the imager 11, has functions different from those of the first server ECU 10A, and provides services other than the camera service to the first client ECU 20A and/or the second client ECU 20B. For example, the second server ECU 10B may be a control device that controls an actuator. In another embodiment, the first server ECU 10A may be equipped with a micro processing unit different from the imager 11 and provide a service other than the camera service.

Figure 3:
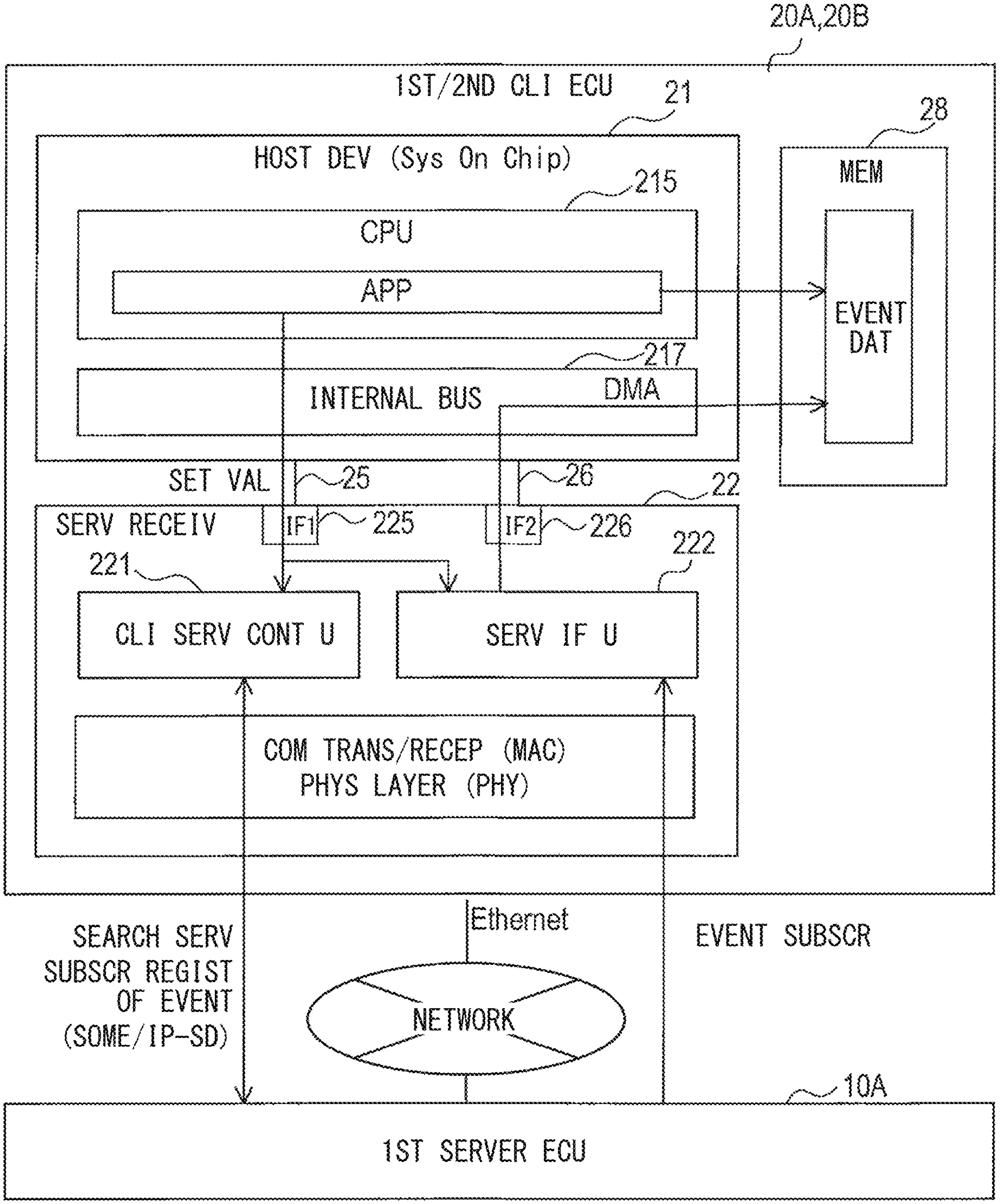
FIG. 3 is a diagram showing a data flow within a client ECU according to the embodiment.

Next, the configuration of the first client ECU 20A will be described with reference to FIGS. 2 and 3. The second client ECU 20B has a similar configuration to the first client ECU 20A, and therefore a description thereof will be omitted. The first client ECU 20A includes a host device 21, a service receiver 22, a first signal line 25, a second signal line 26, and a memory 28.

The host device 21 is a small scale micro processing unit or a system on a chip. As shown in FIG. 3, the host device 21 includes a CPU 215 and an internal bus 217.

Furthermore, the host device 21 has the functions of a setting unit 213 by the CPU 215 executing a program. In another embodiment, the functions of the setting unit 213 may be realized by hardware or a combination of software and hardware.

The host device 21 is connected to the service receiver 22 via a first signal line 25 and a second signal line 26. In detail, the first signal line 25 is connected to a first interface (hereinafter, the first IF) 225 of the service receiver 22 described later, and the second signal line 26 is connected to a second interface (hereinafter, the second IF) 226.

The first signal line 25 is a signal line for transmitting and receiving small amounts of data such as setting values and notifications between the host device 21 and the service receiver 22. The first signal line 25 and the first IF 225 conform to a Serial Peripheral Interface (hereinafter, referred to as SPI) or the like.

The second signal line 26 is a signal line for transmitting large volume data such as a video stream at high speed. The second signal line 26 and the second IF 226 conform to Mobile Industry Processor Interface-Camera Serial Interface (i.e., MIPI-CSI), Mobile Industry Processor Interface-Camera Serial Interface 2 (i.e., MIPI-CSI2), Mobile Industry Processor Interface-Display Serial Interface (i.e., MIPI-DSI), Peripheral Component Interconnect-Express (i.e., PCI-Express), Double Data Rate (i.e., DDR), and the like.

The setting unit 213 has first setting information to be used for communication with the first and second server ECUs 10A, 10B, and instructs a client service control unit 221 (described later) via a first signal line 25 to write the first setting information. In addition, the setting unit 213 has second setting information to be used for communication with the first and second server ECUs 10A, 10B, and instructs a service interface unit (hereinafter, service IF unit) 22 described later via a first signal line 25 to write the second setting information. The first and second setting information are set when the first client ECU 20A is designed.

Specifically, as shown in FIG. 4, the first setting information provides a setting value related to the search of a service and the subject node, and includes the MAC address of the subject node, the IP address of the subject node, a multicast address for service search, a service communication port number as the port number for service-oriented communication, a port number for service-oriented communication, a multicast address for event distribution, and a service ID. The service ID is a number that identifies a service required by the first client ECU 20A.

As shown in FIG. 5, the second setting information provides a setting value to be used for data mutual conversion with the server ECU. The second setting information is, for example, a table, and is information that associates a service type, an event ID, a transport layer protocol type, and a data storage destination address. The type of service includes an event. The types of transport layer protocols include UDP and IEEE1882.

The service transceiver 22 implements a protocol stack for realizing the service-oriented communication. Specifically, the service receiver 22 implements a service-oriented communication protocol such as SOME/IP or DDS. Since the protocol stack for realizing the service-oriented communication requires a large processing load, and therefore it is difficult to implement the protocol stack in the host device 21. For this reason, the service receiver 22 implements a protocol stack for realizing the service-oriented communication. Furthermore, the service receiver 22 implements a protocol for receiving large amounts of data, such as IEEE 1772.

The service receiver 22 includes a client service control unit 221, a service IF unit 222, a first IF 225, and a second IF 226. The first IF 225 and the second IF 226 are realized by hardware.

The client service control unit 221 transmits a search message conforming to the first protocol to the first server ECU 10A and/or the second server ECU 10B via the first Ethernet signal line 50A. The search message is a message for searching for available services.

When the client service control unit 221 receives a presentation message from the first server ECU 10A and/or the second server ECU 10B, the client service control unit 221 transmits an event subscription request conforming to the first protocol to the transmission source of the presentation message via the first Ethernet signal line 50A. Alternatively, the client service control unit 221 may spontaneously transmits an event subscription request regardless of whether or not a presentation message has been received from the first server ECU 10A and/or the second server ECU 10B. For example, the client service control unit 221 may spontaneously transmit an event subscription request to the event distribution source at the time of the previous activation, based on server information at the time of the previous activation, which will be described later.

The service IF unit 222 receives an event message from the first server ECU 10A and/or the second server ECU 10B, and converts the event message into stream data. The event message conforms to the first protocol or the second protocol, and includes a header of the first protocol or the second protocol and RAW data. The service IF unit 222 deletes the header from the event message and converts into the stream data (that is, only RAW data). The service IF unit 222 transmits the stream data to the host device 21 via the second IF 226 and the second signal line 26.

Based on the second setting information, the service IF unit 222 may specify the memory 28 (i.e., the address of the memory 28) as the transmission destination of the stream data, and transmit the stream data to the memory 28 using a direct memory access (hereinafter, DMA) method. When the stream data is transmitted to the memory 28 by the DMA method, the stream data is transmitted from the second IF 226 to the memory 28 via the internal bus 217 without passing through the CPU 215. The CPU 215 accesses the event data in the memory 28 and uses the event data to execute the application program.

When large volume data such as a video stream is transmitted to the CPU 215 and the CPU 215 executes processing the large volume data, the processing load on the CPU 215 increases, and this may cause the processing of the CPU 215 to be delayed. This may result in a delay in the execution of application programs by the CPU 215. By the service IF unit 222 directly transmitting the stream data to the memory 28 by the DMA method, an increase in the processing load of the CPU 215 can be suppressed, and a delay in the execution of the application program by the CPU 215 can be suppressed. In another embodiment, the service IF unit 222 may transmit the stream data to the CPU 215 via the second IF 226 and the internal bus 217.

The service IF unit 222 also has server information related to the server ECU that is distributing the subscription event. Specifically, as shown in FIG. 6, the server information is, for example, a table that associates the ID of an event to which the first client ECU 20A subscribes with the IP address of the server ECU that distributes the event.

The functions of the client service control unit 221 and the service IF unit 222 may be realized by software or by hardware. Alternatively, the functions of the client service control unit 221 and the service IF unit 222 may be realized by a combination of software and hardware.

In this embodiment, the host device 21 corresponds to a main control unit in the present embodiments, and the service receiver 22 corresponds to a communication receiver in the present embodiments.

2. Process

Figure 7:
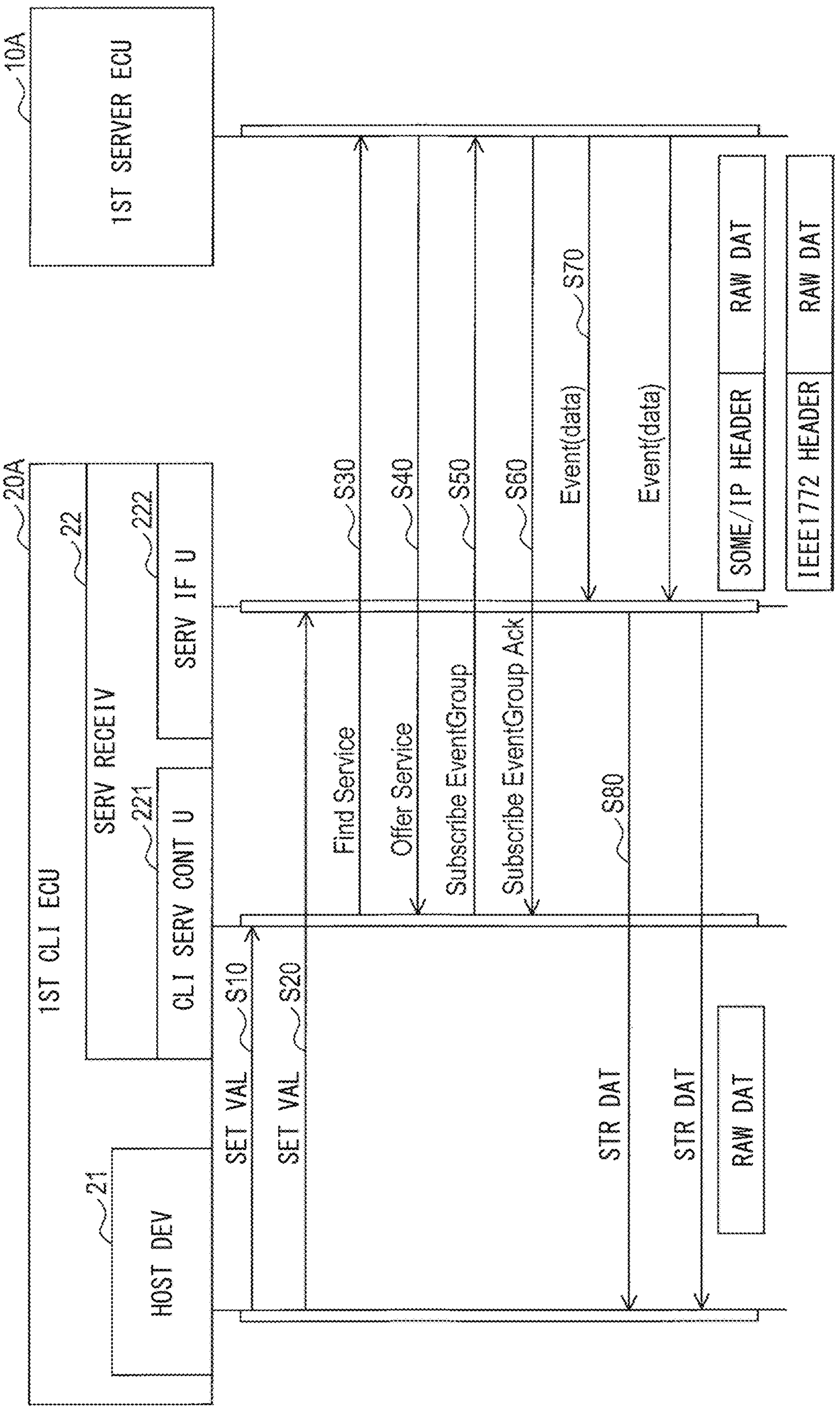
FIG. 7 is a sequence diagram showing communication between a server ECU and a client ECU according to the embodiment.

Next, the process flow in the service-oriented communication will be described with reference to FIG. 7. Here, a process in which the first client ECU 20A receives an event distribution from the first server ECU 10A will be described, but the first client ECU 20A may receive an event distribution from the second server ECU 10B in addition to or instead of the first server ECU 10A.

In S10, the host device 21 transmits the first setting information conforming to the SPI to the client service control unit 221 via the first signal line 25 and the first IF 225, and instructs the client service control unit 221 to write the first setting information.

In S20, the host device 21 transmits the second setting information conforming to the SPI to the service IF unit 222 via the first signal line 25 and the first IF unit 225, and instructs the service IF unit 222 to write the second setting information.

Next, in S30, the client service control unit 221 transmits a search message (i.e., Find Service) conforming to SOME/IP to the first server ECU 10A via the first Ethernet signal line 50A based on the first setting information.

Next, in S40, the first server ECU 10A, upon receiving the search message or upon activating, transmits a presentation message (i.e., Offer Service) conforming to SOME/IP to the first client ECU 20A (specifically, the client service control unit 221 of the service receiver 22) via the first Ethernet signal line 50A. The presentation message indicates that the first server ECU 10A provides a service of periodically distributing a video stream.

Next, in S50, the client service control unit 221 receives the presentation message and transmits an event subscription request message (i.e., Subscribe Event Group) conforming to SOME/IP to the first server ECU 10A via the first Ethernet signal line 50A. The event subscription request message is a message requesting joining a group that subscribes to the event. The client service control unit 221 may spontaneously transmit an event subscription request message to the first server ECU 10A.

Next, in S60, the first server ECU 10A transmits an event subscription acceptance message (i.e., Subscribe Event Group Ack) conforming to SOME/IP to the client service control unit 221 via the first Ethernet signal line 50A. As a result, the client service control unit 221 registers the IP address of the first server ECU 10A in the server information in association with the ID of the subscription event. When the client service control unit 221 subscribes to only one type of event from the first server ECU 10A, it is sufficient to register only the IP address of the first server ECU 10A in the server information. When the first server ECU 10A is registered in the server information, the service-oriented communication is established between the first client ECU 20A and the first server ECU 10A.

Next, in S70, the first server ECU 10A transmits the event data to the service IF unit 222 via the first Ethernet signal line 50A. The event data conforms to the SOME/IP or IEEE 1722 protocol, and includes a SOME/IP or IEEE 1722 header and RAW data. The first server ECU 10A repeatedly transmits the event data to the service IF unit 222 at a predetermined period.

Next, in S80, the service IF unit 222 generates the stream data by removing the header from the received event data, and transmits the generated stream data to the host device 21 via the second IF 226 and the second signal line 26. At this time, the service IF unit 222 may specify the memory 28 as the transmission destination of the stream data based on the second setting information, and transmit the stream data to the memory 28 by the DMA method. Every time the service IF unit 222 receives the event data from the first server ECU 10A, the service IF unit 222 converts the event data into the stream data and transmits the stream data to the host device 21.

3. State Transition

Figures 8A, 8B:
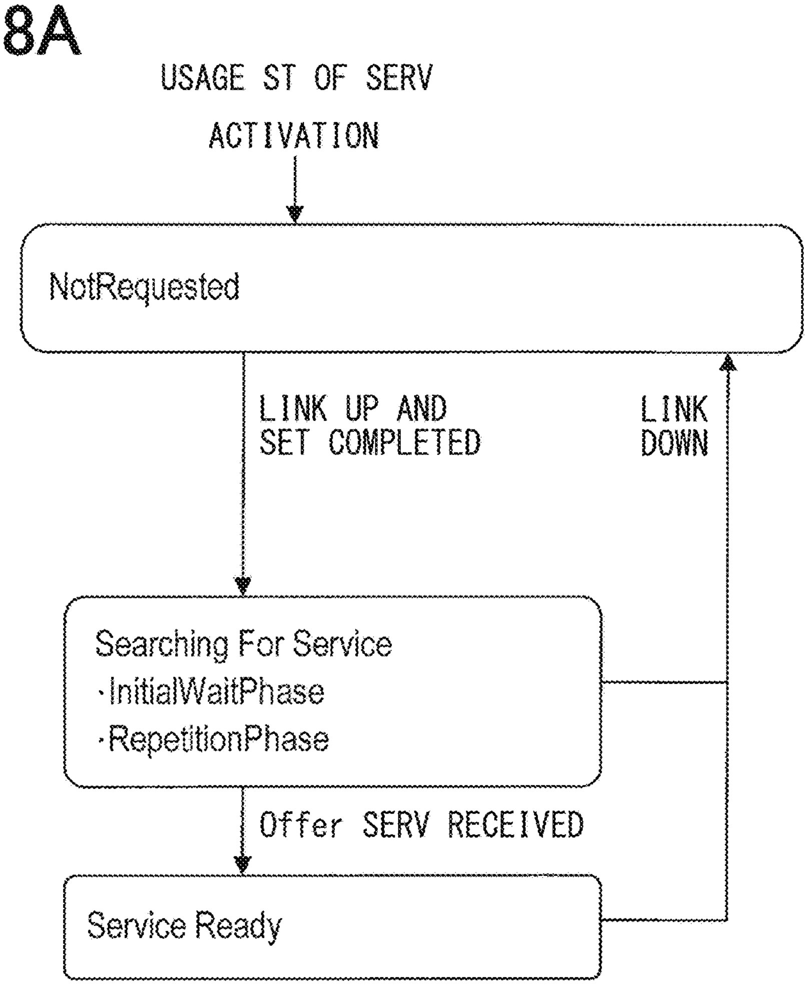
FIGS. 8A and 8B are diagrams showing the transition of a service usage state of a service receiver of a client ECU according to the embodiment.

Next, the transition of the service usage state of the first client ECU 20A will be described with reference to FIGS. 8A and 8B. The transition of the service usage state of the second client ECU 20B is similar to the transition of the service usage state of the first client ECU 20A, so a description thereof will be omitted. After the first client ECU 20A is activated, the service usage state becomes a Not Requested state.

In the Not Requested state, the first client ECU 20A is not requesting a service. When the first setting information and the second setting information are set in the service receiver 22, the service usage state transitions from the Not Requested state to the Searching For Service state.

In the Searching For Service state, the first client ECU 20A is requesting a service. In the Searching For Service state, the client service control unit 221 transmits a signal of Find Service to the server ECU. Then, when the client service control unit 221 receives an Offer Service from the server ECU, the service usage state transitions from the Searching For Service state to the Service Ready state.

In the Service Ready state, the client service control unit 221 stops transmitting the signal of the Find Service. Then, the client service control unit 221 requests the server ECU to subscribe to the event, and starts utilizing the service. In the Service Ready state, the service IF unit 222 may transmit the event data received from the server ECU to the host device 21 regardless of the subscription state of the event. When linking down in the Searching For Service state or the Service Ready state, the state transitions to the Not Requested state.

Figure 9A:
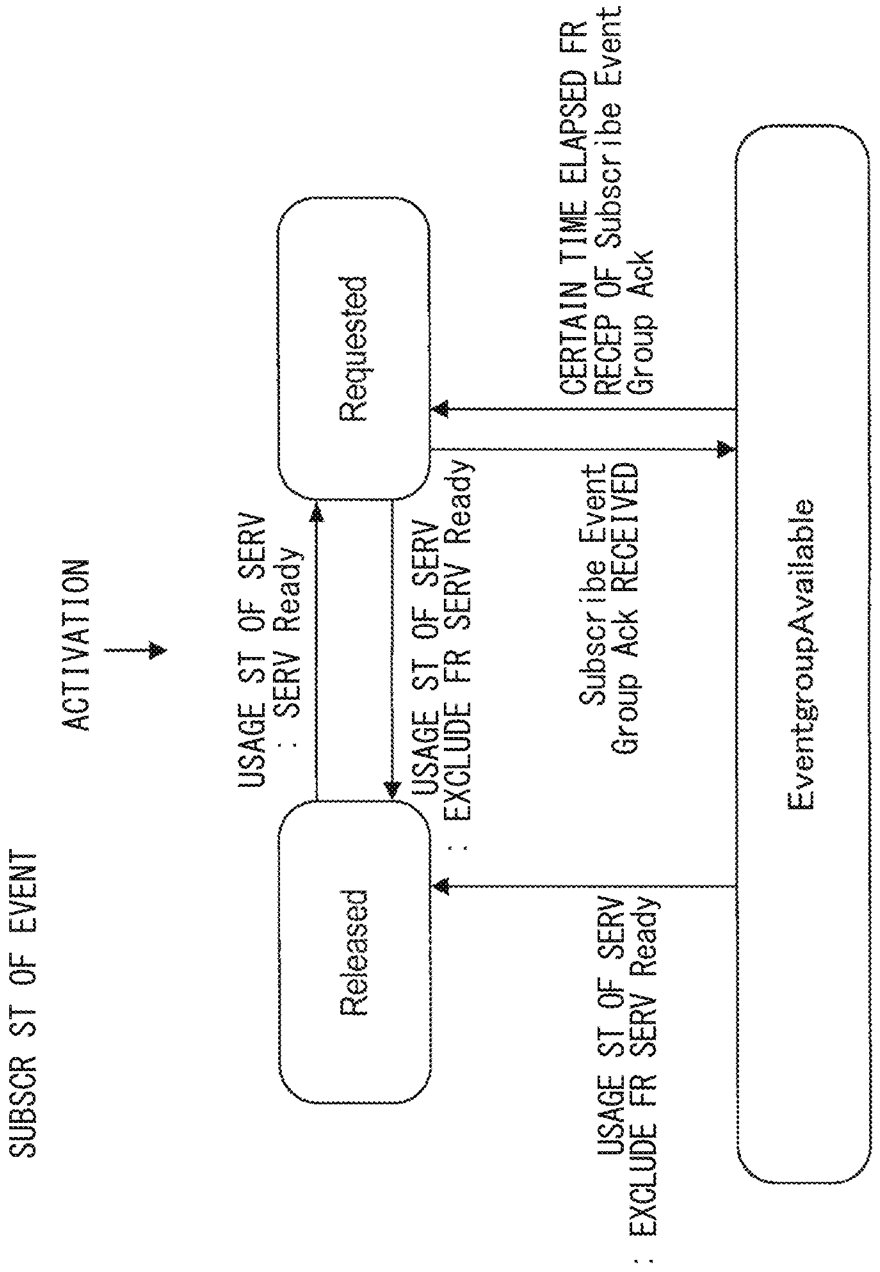

Next, the transition of the event subscription state of the first client ECU 20A will be described with reference to FIGS. 9A and 9B. The transition of the event subscription state of the second client ECU 20B is similar to the transition of the event subscription state of the first client ECU 20A, and therefore a description thereof will be omitted. After the first client ECU 20A is activated, the subscription state of the event becomes the Released state.

In the Released state, the service is not being distributed, and the client service control unit 221 has not requested the subscription to an event.

When the client service control unit 221 starts to transmit a Subscribe Event Group to the server ECU, the event subscription state transitions from the Released state to the Requested state. In the Requested state, the client service control unit 221 transmits a Subscribe Event Group to the server ECU at regular intervals.

When the client service control unit 221 receives a Service Event Group Ack in the Requested state, the event subscription state transitions from the Requested state to the Event Group Available state. In the Requested state, if the client service control unit 221 stops transmitting the Subscribe Event Group without receiving a Service Event Group Ack, the event subscription state returns from the Requested state to the Released state. In the Requested state, the service IF unit 222 may transmit the received event data to the host device 21.

In the Event Group Available state, a service is being distributed to the first client ECU 20A, and the first client ECU 20A is subscribing to the event. When the client service control unit 221 receives the Subscribe Event Group Ack, the client service control unit 221 stops transmitting the Subscribe Event Group at regular intervals. In the Event Group Available state, if the service IF unit 222 does not receive the event data even after a certain time has elapsed since the client service control unit 221 received the Subscribe Event Group Ack, the event subscription state returns from the Event Group Available state to the Requested state. Furthermore, if the subscription to the event is cancelled in the Event Group Available state, the event subscription state transitions from the Event Group Available state to the Released state. In the Event Group Available state, the service IF unit 222 may transmit the received event data to the host device 21.

4. Effect

According to the present embodiment described in detail above, the following effects are obtained.

(1) The service receiver 22 is connected to the host device 21, and the first setting information and the second setting information are set. It is possible to introduce the service-oriented communication to the first and second client ECUs 20A and 20B even if a protocol stack for service communication cannot be implemented in the host device 21. Therefore, the service-oriented communication can be realized overall between the first and second client ECUs 20A, 20B and the first and second server ECUs 10A, 10B.

(2) The client service control unit 221 voluntarily transmits an event subscription request to the first server ECU 10A, so that the first and second client ECUs 20A, 20B can more reliably receive the distribution of desired events.

(3) By the service IF unit 222 transmitting the stream data to the memory 28 by the DMA method, the processing load on the CPU 215 can be reduced, and delays in processing by the CPU 215 can be reduced, even when the stream data is large amount.

(4) By establishing the service-oriented communication using a first protocol suitable for the service-oriented communication and transmitting and receiving the event data using a second protocol suitable for transmitting large amounts of data, it is possible to perform the communication more efficiently.

(5) By using the first IF 225 as an SPI, small amounts of data such as setting values and notifications can be efficiently transmitted and received between the host device 21 and the service receiver 22.

(6) By configuring the second IF 226 as any one of MIPI-CSI, MIPI-CSI2, MIPI-DSI, PCI-Express, and DDR, large amounts of data can be transmitted at high speed from the service receiver 22 to the host device 21.

Other Embodiments

Although the embodiments of the present disclosure have been described above, the present disclosure is not limited to the embodiments described above, and various modifications can be made to implement the present disclosure.

(a) In the above embodiment, the first client ECU 20A receives the event distribution in the service-oriented communication. Alternatively, the first server ECU 10A and/or the second server ECU 10B may also perform bidirectional communication with the first client ECU 20A.

(b) The service receiver 22 and techniques thereof described in the present embodiments may be implemented by a dedicated computer provided by configuring a processor and a memory programmed to execute one or more functions embodied by a computer program. Alternatively, the service receiver 22 and the technique according to the present embodiments may be achieved by a dedicated computer provided by constituting a processor with one or more dedicated hardware logic circuits. Alternatively, the service receiver 22 and method described in the present embodiments may be realized by one or more dedicated computer, which is configured as a combination of a processor and a memory, which are programmed to perform one or more functions, and a processor which is configured with one or more hardware logic circuits. The computer program may be stored in a computer-readable non-transitory tangible storage medium as instructions to be executed by a computer. The method for implementing the functions of the units included in the service receiver 22 does not necessarily include software, and all the functions may be implemented using one or a plurality of pieces of hardware.

(c) The multiple functions of one component in the above embodiments may be realized by multiple components, or a function of one component may be realized by multiple components. Further, multiple functions of multiple elements may be implemented by one element, or one function implemented by multiple elements may be implemented by one element. Part of the configuration of the above embodiment may be omitted. At least a part of the configuration in one embodiment may be added to or substituted for the configuration of another embodiment.

(d) In addition to the above-described communication receiver, the present embodiments can also be realized in various forms, such as a system having the communication receiver as a component thereof, a program for causing a computer to function as the communication receiver, a non-transitory tangible storage medium such as a semiconductor memory on which the program is stored, and a service-oriented communication method.

Technical Features Disclosed in Present Disclosure

Feature 1

A communication receiver is connected to a main control unit of a communication device configured to be connected to an electronic control device via a single or a plurality of communication lines. The communication receiver includes: at least one of (i) a circuit and (ii) a processor having a memory storing computer program code; a first interface configured to be connected to the main control unit; and a second interface configured to be connected to the main control unit.

The at least one of the circuit and the processor having the memory is configured to cause the communication receiver to:

transmit a search message for searching for a service to the electronic control device conforming to a first protocol, which is a service communication protocol, based on first setting information received from the main control unit via the first interface;

convert an event message conforming to the first protocol or a second protocol different from the first protocol received from the electronic control device into stream data based on second setting information received from the main control unit via the first interface; and transmit the stream data to the main control unit via the second interface.

Feature 2

In the communication receiver according to feature 1, the at least one of the circuit and the processor having the memory is configured to cause the communication receiver to: spontaneously transmit a service subscription request to the electronic control device.

Feature 3

In the communication receiver according to feature 1 or 2, the at least one of the circuit and the processor having the memory is configured to cause the communication receiver to: transmit the stream data to a memory designated by the second setting information via the second interface and the main control unit in a direct memory access manner.

Feature 4

In the communication receiver according to any one of features 1 to 3, the first protocol is Scalable service-Oriented Middleware over IP or Data Distribution Service.

Feature 5

In the communication receiver according to any one of features 1 to 4, the second protocol is Institute of Electrical and Electronics Engineers 1722.

Feature 6

In the communication receiver according to any one of features 1 to 5, the first interface is a Serial Peripheral Interface.

Feature 7

In the communication receiver according to any one of features 1 to 6, the second interface is Mobile Industry Processor Interface—Camera Serial Interface, Mobile Industry Processor Interface—Camera Serial Interface 2, Mobile Industry Processor Interface—Display Serial Interface, Peripheral Component Interconnect—Express, Double Data Rate, or the like.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication receiver connected to a main control unit of a communication device configured to be connected to an electronic control device via a single or a plurality of communication lines, the communication receiver comprising:

a first interface configured to be connected to the main control unit;

a second interface configured to be connected to the main control unit;

a service control unit configured to transmit a search message for searching for a service to the electronic control device conforming to a first protocol, which is a service-oriented communication protocol, based on first setting information received from the main control unit via the first interface; and a service interface unit configured to convert an event message conforming to the first protocol or a second protocol different from the first protocol received from the electronic control device into stream data based on second setting information received from the main control unit via the first interface, and to transmit the stream data to the main control unit via the second interface, wherein the service control unit transmits the search message conforming to the service-oriented communication protocol to the electronic control device, so that service-oriented communication is achieved even in a case where a protocol stack cannot be implemented in the main control unit of the communication device.

2. The communication receiver according to claim 1, wherein:

the service control unit is configured to spontaneously transmit a service subscription request to the electronic control device.

3. The communication receiver according to claim 1, wherein:

the service interface unit is configured to transmit the stream data to a memory designated by the second setting information via the second interface and the main control unit in a direct memory access manner.

4. The communication receiver according to claim 1, wherein:

the first protocol is Scalable service-Oriented Middleware over IP or Data Distribution Service.

5. The communication receiver according to claim 1, wherein:

the second protocol is Institute of Electrical and Electronics Engineers 1722.

6. The communication receiver according to claim 1, wherein:

the first interface is a Serial Peripheral Interface.

7. The communication receiver according to claim 1, wherein:

the second interface is at least one of Mobile Industry Processor Interface-Camera Serial Interface, Mobile Industry Processor Interface-Camera Serial Interface 2, Mobile Industry Processor Interface-Display Serial Interface, Peripheral Component Interconnect-Express, and Double Data Rate.

8. The communication receiver according to claim 1, further comprising:

at least one of (i) a circuit and (ii) a processor having a memory storing computer program code, wherein:

the at least one of the circuit and the processor having the memory is configured to cause the communication receiver to provide at least one of: the first interface; the second interface; the service control unit; and the service interface unit.

* * * * *